United States Patent
Wang et al.

(10) Patent No.: US 9,769,729 B2
(45) Date of Patent: Sep. 19, 2017

(54) APPARATUS AND METHOD FOR IMPLEMENTING COLLABORATIVE WORK OF CELLS

(71) Applicant: HUAWEI TECHNOLOGIES CO., LTD., Shenzhen, Guangdong (CN)

(72) Inventors: Jueping Wang, Shanghai (CN); Si Zhang, Shanghai (CN); Peng Lan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/343,593

(22) Filed: Nov. 4, 2016

(65) Prior Publication Data

US 2017/0078944 A1 Mar. 16, 2017

Related U.S. Application Data

(63) Continuation of application No. PCT/CN2014/076896, filed on May 6, 2014.

(51) Int. Cl.
*H04W 40/22* (2009.01)
*H04W 56/00* (2009.01)
(Continued)

(52) U.S. Cl.
CPC ............ *H04W 40/22* (2013.01); *H04B 7/024* (2013.01); *H04W 56/004* (2013.01); *H04W 76/02* (2013.01); *H04W 92/20* (2013.01)

(58) Field of Classification Search
CPC ... H04W 40/22; H04W 56/004; H04W 76/02; H04W 92/20; H04W 56/0055; H04W 84/08; H04B 7/024; H04H 20/77
(Continued)

(56) References Cited

U.S. PATENT DOCUMENTS 5,454,079 A * 9/1995 Roper ............... H04L 69/04
709/227
5,982,771 A * 11/1999 Caldara ............ G06F 15/17375
370/389
(Continued)

FOREIGN PATENT DOCUMENTS

GB 2498959 8/2013
WO WO2013114086 8/2013

OTHER PUBLICATIONS

International Search Report dated Feb. 4, 2015 in corresponding International Application No. PCT/CN2014/076896.
(Continued)

*Primary Examiner* — Hai V Nguyen
(74) *Attorney, Agent, or Firm* — Staas & Halsey LLP (57) ABSTRACT

The present invention discloses an apparatus and a method for implementing collaborative work of cells, and belongs to the field of wireless communications. The method includes: acquiring a transmission delay and a transmission bandwidth that are of a serving cell and a transmission delay and a transmission bandwidth that are of at least one collaboration cell; separately acquiring a transmission scenario of each collaboration cell of the at least one collaboration cell according to the transmission delay and the transmission bandwidth that are of the serving cell and a transmission delay and a transmission bandwidth that are of each collaboration cell; and calling a collaboration function according to the transmission scenario of each collaboration cell, and implementing collaborative work of cells by using the collaboration function. The present invention ensures normal work of the collaboration function and enables the collaboration function to produce a maximum collaboration function gain.

20 Claims, 3 Drawing Sheets

(51) Int. Cl.
  *H04B 7/024* (2017.01)
  *H04W 76/02* (2009.01)
  *H04W 92/20* (2009.01)

(58) Field of Classification Search
  USPC .................................................. 455/7, 4, 15
  See application file for complete search history.

(56) References Cited

U.S. PATENT DOCUMENTS

| | | | | |
|---|---|---|---|---|
| 6,134,217 | A * | 10/2000 | Stiliadis | H04L 49/3081 370/232 |
| 6,522,629 | B1 * | 2/2003 | Anderson, Sr. | H04L 41/022 370/236 |
| 6,625,160 | B1 * | 9/2003 | Suzuki | H04L 12/5693 370/412 |
| 6,760,774 | B1 * | 7/2004 | Soumiya | H04L 12/5695 709/226 |
| 6,816,903 | B1 * | 11/2004 | Rakoshitz | H04L 12/2602 370/230 |
| 7,027,408 | B2 * | 4/2006 | Nabkel | H04L 12/24 370/252 |
| 7,035,211 | B1 * | 4/2006 | Smith | H04L 12/5602 370/230 |
| 7,113,987 | B2 * | 9/2006 | Nabkel | H04L 12/589 370/265 |
| 7,152,220 | B2 * | 12/2006 | Rickards, III | G06F 8/71 717/101 |
| 7,321,567 | B2 * | 1/2008 | Qazi | H04L 1/188 370/278 |
| 7,480,239 | B1 * | 1/2009 | Sundaresan | H04L 12/5601 370/230 |
| 8,432,821 | B2 * | 4/2013 | Gorokhov | H04L 5/0023 370/252 |
| 8,712,399 | B2 * | 4/2014 | Chen | H04W 72/005 370/329 |
| 8,787,302 | B2 * | 7/2014 | Balachandran | H04B 7/024 370/329 |
| 8,787,922 | B2 * | 7/2014 | Hwang | H04W 72/082 455/436 |
| 9,065,606 | B2 * | 6/2015 | Balachandran | H04B 7/024 |
| 9,178,576 | B2 * | 11/2015 | Seo | H04B 7/024 |
| 9,277,551 | B2 * | 3/2016 | Lim | H04L 1/1854 |
| 9,312,995 | B2 * | 4/2016 | Baligh | H04L 5/0032 |
| 9,439,048 | B2 * | 9/2016 | Benco | H04W 4/12 |
| 9,504,041 | B2 * | 11/2016 | Wang | H04L 1/1854 |
| 9,520,931 | B2 * | 12/2016 | Ma | H04B 7/024 |
| 9,571,384 | B2 * | 2/2017 | Wu | H04L 45/302 |
| 2003/0086437 | A1 * | 5/2003 | Benveniste | H04L 47/10 370/461 |
| 2003/0174690 | A1 * | 9/2003 | Benveniste | H04W 74/02 370/350 |
| 2004/0042569 | A1 * | 3/2004 | Casabona | H04B 7/18513 375/346 |
| 2005/0070246 | A1 * | 3/2005 | Qazi | H04L 1/188 455/347 |
| 2005/0080894 | A1 * | 4/2005 | Apostolopoulos | H04L 41/0816 709/224 |
| 2005/0095981 | A1 * | 5/2005 | Benco | H04W 4/12 455/3.06 |
| 2005/0120105 | A1 * | 6/2005 | Popescu | H04L 12/24 709/223 |
| 2005/0254440 | A1 * | 11/2005 | Sorrell | H04L 29/06027 370/264 |
| 2006/0153100 | A1 * | 7/2006 | Dube | H04L 12/185 370/256 |
| 2007/0112971 | A1 * | 5/2007 | Noff | H04L 29/06027 709/231 |
| 2007/0133488 | A1 * | 6/2007 | Muthuswamy | H04L 45/42 370/338 |
| 2008/0162637 | A1 * | 7/2008 | Adamczyk | H04L 12/5815 709/204 |
| 2008/0297414 | A1 * | 12/2008 | Krishnaswamy | H01Q 3/28 342/368 |
| 2009/0196406 | A1 * | 8/2009 | Brown | H04M 7/0027 379/93.17 |
| 2010/0041409 | A1 * | 2/2010 | Kim | H04L 1/0002 455/450 |
| 2010/0067450 | A1 * | 3/2010 | Balachandran | H04B 7/024 370/329 |
| 2010/0085917 | A1 * | 4/2010 | Gorokhov | H04L 5/0023 370/328 |
| 2010/0104033 | A1 * | 4/2010 | Gorokhov | H04L 1/0026 375/260 |
| 2010/0239255 | A1 * | 9/2010 | Ikeda | H04J 3/1694 398/66 |
| 2010/0278123 | A1 * | 11/2010 | Fong | H04B 7/2656 370/329 |
| 2010/0285792 | A1 * | 11/2010 | Chen | H04W 72/005 455/422.1 |
| 2011/0014924 | A1 * | 1/2011 | Hwang | H04W 72/082 455/452.1 |
| 2011/0103287 | A1 * | 5/2011 | Ma | H04B 7/0639 370/312 |
| 2011/0126127 | A1 * | 5/2011 | Mariotti | G06F 19/321 715/753 |
| 2011/0305293 | A1 * | 12/2011 | Choi | H04W 72/082 375/285 |
| 2012/0254942 | A1 * | 10/2012 | Hayashi | G06F 9/505 726/3 |
| 2012/0307704 | A1 | 12/2012 | Roman et al. | |
| 2013/0136062 | A1 * | 5/2013 | Gorokhov | B25B 23/0021 370/328 |
| 2013/0208604 | A1 * | 8/2013 | Lee | H04L 25/0226 370/252 |
| 2013/0223258 | A1 * | 8/2013 | Seo | H04W 24/02 370/252 |
| 2013/0310098 | A1 * | 11/2013 | Baligh | H04L 5/0032 455/509 |
| 2013/0315196 | A1 * | 11/2013 | Lim | H04L 1/1861 370/329 |
| 2014/0161023 | A1 * | 6/2014 | Seo | H04B 7/024 370/315 |
| 2014/0269640 | A1 * | 9/2014 | Balachandran | H04B 7/024 370/336 |
| 2014/0317232 | A1 * | 10/2014 | Wang | H04L 67/1097 709/217 |
| 2015/0049163 | A1 * | 2/2015 | Smurro | H04L 65/4015 348/14.08 |
| 2015/0063112 | A1 * | 3/2015 | Wu | H04L 45/302 370/235 |
| 2015/0081796 | A1 * | 3/2015 | Xu | H04L 65/607 709/204 |
| 2015/0092717 | A1 * | 4/2015 | Seo | H04W 24/02 370/329 |
| 2015/0146611 | A1 * | 5/2015 | Joshi | H04W 28/0231 370/328 |
| 2015/0189640 | A1 * | 7/2015 | Lee | H04L 5/0053 370/329 |
| 2015/0242801 | A1 * | 8/2015 | Cudak | G06Q 10/06393 705/7.19 |
| 2015/0256638 | A1 * | 9/2015 | Schwartz | H04L 65/4015 709/203 |
| 2015/0334732 | A1 * | 11/2015 | Caretti | H04W 72/1221 370/329 |
| 2015/0356331 | A1 * | 12/2015 | Luo | G06K 19/07309 367/197 |
| 2016/0029281 | A1 * | 1/2016 | Zhou | H04W 4/001 370/331 |
| 2016/0036541 | A1 * | 2/2016 | Siomina | H04B 17/345 455/422.1 |
| 2016/0143036 | A1 * | 5/2016 | Lim | H04L 1/1861 370/329 |
| 2016/0156494 | A1 * | 6/2016 | Zhao | H04B 7/2656 370/476 |

(56) References Cited

U.S. PATENT DOCUMENTS

2016/0211950 A1* 7/2016 Cheng ................... H04L 1/1864
2016/0309471 A1* 10/2016 Lee ..................... H04W 72/042

OTHER PUBLICATIONS

Extended European Search Report, dated Apr. 5, 2017, in European Application No. 14891487.2 (11 pp.).
3rd Generation Partnership Project; Technical Specification Group Radio Access Network; Coordinated multi-point Operation for LTE physical layer aspects (Release 11), 3GPP TR 36.819 V11.2.0 (Sep. 2013), pp. 1-70.

* cited by examiner

APPARATUS AND METHOD FOR IMPLEMENTING COLLABORATIVE WORK OF CELLS

CROSS-REFERENCE TO RELATED APPLICATIONS

This application is a continuation of International Application No. PCT/CN2014/076896, filed on May 6, 2014, the disclosure of which is hereby incorporated by reference in its entirety.

TECHNICAL FIELD

The present invention relates to the field of wireless communications, and in particular, to an apparatus and a method for implementing collaborative work of cells.

BACKGROUND

A collaboration function refers to that a serving cell performs joint processing on data of the cell and data of a collaboration cell. Currently, a method for implementing collaborative work of cells is provided, including: an operator determines a serving cell according to requirements of a preset collaboration function on a transmission delay and a transmission bandwidth that are of the serving cell, and determines a collaboration cell according to requirements of the preset collaboration function on a transmission delay and a transmission bandwidth that are of the collaboration cell, so that the serving cell may perform joint processing on data of the serving cell and data of the collaboration cell by using the collaboration function.

During implementation of the present invention, the inventor finds that the prior art has at least the following problem:

A transmission delay and a transmission bandwidth that are of a cell are changeable. After an operator determines a serving cell and a collaboration cell, if a transmission delay of the collaboration cell or a transmission bandwidth of the collaboration cell changes, resulting in that the transmission delay of the collaboration cell or the transmission bandwidth of the collaboration cell cannot meet a corresponding requirement of a preset collaboration function on the collaboration cell, the collaboration cell is still used to participate in the preset collaboration function, which reduces a collaboration function gain, and even makes the collaboration function fail.

SUMMARY

To resolve the problems in the prior art, the present invention provides an apparatus and a method for implementing collaborative work of cells. The technical solutions are as follows:

According to a first aspect, the present invention provides an apparatus for implementing collaborative work of cells, where the apparatus includes:

a first acquiring module, configured to acquire a transmission delay and a transmission bandwidth that are of a serving cell and a transmission delay and a transmission bandwidth that are of at least one collaboration cell;

a second acquiring module, configured to separately acquire a transmission scenario of each collaboration cell of the at least one collaboration cell according to the transmission delay and the transmission bandwidth that are of the serving cell and a transmission delay and a transmission bandwidth that are of each collaboration cell; and a collaboration module, configured to call a collaboration function according to the transmission scenario of each collaboration cell, and implement collaborative work of cells by using the collaboration function.

With reference to the first aspect, in a first possible implementation manner of the first aspect, the second acquiring module includes:

a first acquiring unit, configured to acquire a transmission type of the serving cell according to the transmission delay and the transmission bandwidth that are of the serving cell;

a second acquiring unit, configured to separately acquire a transmission type of each collaboration cell according to the transmission delay and the transmission bandwidth that are of each collaboration cell; and a third acquiring unit, configured to separately acquire the transmission scenario of each collaboration cell according to the transmission type of the serving cell and the transmission type of each collaboration cell.

With reference to the first possible implementation manner of the first aspect, in a second possible implementation manner of the first aspect, the first acquiring unit includes:

a first determining subunit, configured to determine a transmission delay range and a transmission bandwidth range that are of the serving cell according to the transmission delay and the transmission bandwidth that are of the serving cell; and a first acquiring subunit, configured to acquire the transmission type of the serving cell from a correspondence among the transmission delay range, the transmission bandwidth range, and the transmission type according to the transmission delay range, and the transmission bandwidth range that are of the serving cell.

With reference to the first possible implementation manner of the first aspect, in a third possible implementation manner of the first aspect, the second acquiring unit includes:

a second determining subunit, configured to separately determine a transmission delay range and a transmission bandwidth range that are of each collaboration cell according to the transmission delay and the transmission bandwidth that are of each collaboration cell; and a second acquiring subunit, configured to separately acquire the transmission type of each collaboration cell from a correspondence among the transmission delay range, the transmission bandwidth range, and the transmission type according to the transmission delay range, and the transmission bandwidth range that are of each collaboration cell.

With reference to the first possible implementation manner of the first aspect, in a fourth possible implementation manner of the first aspect, the third acquiring unit is configured to separately acquire the transmission scenario of each collaboration cell from a correspondence among the transmission type of the serving cell, the transmission type of the collaboration cell, and the transmission scenario according to the transmission type of the serving cell and the transmission type of each collaboration cell.

With reference to the first aspect, in a fifth possible implementation manner of the first aspect, the collaboration module includes:

a first selection unit, configured to select a collaboration cell having a same transmission scenario from each collaboration cell;

a first formation unit, configured to form a first cell connection set by using the serving cell and the selected collaboration cell, and form a first transmission scenario set by using the transmission scenario of the selected collaboration cell;

a first call unit, configured to call a corresponding collaboration function according to the first transmission scenario set; and a first collaboration unit, configured to perform collaborative work on the cells in the first cell connection set by using the collaboration function.

With reference to the fifth possible implementation manner of the first aspect, in a sixth possible implementation manner of the first aspect, the first call unit is configured to acquire the corresponding collaboration function from a correspondence between a transmission scenario set and the collaboration function according to the first transmission scenario set.

With reference to the first aspect, in a seventh possible implementation manner of the first aspect, the collaboration module includes:

a second selection unit, configured to select a preset quantity of collaboration cells having highest priorities from each collaboration cell;

a second formation unit, configured to form a second cell connection set by using the serving cell and the selected preset quantity of collaboration cells, and form a second transmission scenario set by using the transmission scenario of the selected preset quantity of collaboration cells;

a second call unit, configured to call a corresponding collaboration function according to the second transmission scenario set; and a second collaboration unit, configured to perform collaborative work on the cells in the second cell connection set by using the collaboration function.

With reference to the seventh possible implementation manner of the first aspect, in an eighth possible implementation manner of the first aspect, the second call unit is configured to acquire the corresponding collaboration function from a correspondence between a transmission scenario set and the collaboration function according to the second transmission scenario set.

With reference to the first aspect, in a ninth possible implementation manner of the first aspect, the collaboration module includes:

a third selection unit, configured to select a collaboration cell having a highest priority from each collaboration cell;

a fourth selection unit, configured to select a second preset quantity of collaboration cells having highest priorities from a collaboration cell having the same transmission scenario as the collaboration cell having the highest priority;

a third formation unit, configured to form a third cell connection set by using the serving cell, the collaboration cell having the highest priority and the selected second preset quantity of collaboration cells, and form a third transmission scenario set by using the transmission scenario of the collaboration cell having the highest priority;

a third call unit, configured to call a corresponding collaboration function according to the third transmission scenario set; and a third collaboration unit, configured to perform collaborative work on the cells in the third cell connection set by using the collaboration function.

With reference to the ninth possible implementation manner of the first aspect, in a tenth possible implementation manner of the first aspect, the third call unit is configured to acquire the corresponding collaboration function from a correspondence between a transmission scenario set and the collaboration function according to the third transmission scenario set.

According to a second aspect, the present invention provides a method for implementing collaborative work of cells, where the method includes:

acquiring a transmission delay and a transmission bandwidth that are of a serving cell and a transmission delay and a transmission bandwidth that are of at least one collaboration cell;

separately acquiring a transmission scenario of each collaboration cell of the at least one collaboration cell according to the transmission delay and the transmission bandwidth that are of the serving cell and the transmission delay and the transmission bandwidth that are of each collaboration cell; and calling a collaboration function according to the transmission scenario of each collaboration cell, and implementing collaborative work of cells by using the collaboration function.

With reference to the second aspect, in a first possible implementation manner of the second aspect, the separately acquiring a transmission scenario of each collaboration cell of the at least one collaboration cell according to the transmission delay and the transmission bandwidth that are of the serving cell and the transmission delay and the transmission bandwidth that are of each collaboration cell includes:

acquiring a transmission type of the serving cell according to the transmission delay and the transmission bandwidth that are of the serving cell;

separately acquiring a transmission type of each collaboration cell according to the transmission delay and the transmission bandwidth that are of each collaboration cell; and separately acquiring the transmission scenario of each collaboration cell according to the transmission type of the serving cell and the transmission type of each collaboration cell.

With reference to the first possible implementation manner of the second aspect, in a second possible implementation manner of the second aspect, the acquiring a transmission type of the serving cell according to the transmission delay and the transmission bandwidth that are of the serving cell includes:

determining a transmission delay range and a transmission bandwidth range that are of the serving cell according to the transmission delay and the transmission bandwidth that are of the serving cell; and acquiring the transmission type of the serving cell from a correspondence among the transmission delay range, the transmission bandwidth range, and the transmission type according to the transmission delay range and the transmission bandwidth range that are of the serving cell.

With reference to the first possible implementation manner of the second aspect, in a third possible implementation manner of the second aspect, the separately acquiring a transmission type of each collaboration cell according to the transmission delay and the transmission bandwidth that are of each collaboration cell includes:

separately determining a transmission delay range and a transmission bandwidth range that are of each collaboration cell according to the transmission delay and the transmission bandwidth that are of each collaboration cell; and separately acquiring the transmission type of each collaboration cell from a correspondence among the transmission delay range, the transmission bandwidth range, and the transmission type according to the transmission delay range and the transmission bandwidth range that are of each collaboration cell.

With reference to the first possible implementation manner of the second aspect, in a fourth possible implementation manner of the second aspect, the acquiring the transmission scenario of each collaboration cell according to the transmission type of the serving cell and the transmission type of each collaboration cell includes:

separately acquiring the transmission scenario of each collaboration cell from a correspondence among the transmission type of the serving cell, the transmission type of the collaboration cell, and the transmission scenario according to the transmission type of the serving cell and the transmission type of each collaboration cell.

With reference to the second aspect, in a fifth possible implementation manner of the second aspect, the calling a collaboration function according to the transmission scenario of each collaboration cell, and implementing collaborative work of cells by using the collaboration function includes:

selecting a collaboration cell having a same transmission scenario from each collaboration cell;

forming a first cell connection set by using the serving cell and the selected collaboration cell, and forming a first transmission scenario set by using the transmission scenario of the selected collaboration cell;

calling a corresponding collaboration function according to the first transmission scenario set; and performing collaborative work on the cells in the first cell connection set by using the collaboration function.

With reference to the fifth possible implementation manner of the second aspect, in a sixth possible implementation manner of the second aspect, the calling a corresponding collaboration function according to the first transmission scenario set includes:

acquiring the corresponding collaboration function from a correspondence between a transmission scenario set and the collaboration function according to the first transmission scenario set.

With reference to the second aspect, in a seventh possible implementation manner of the second aspect, the calling a collaboration function according to the transmission scenario of each collaboration cell, and implementing collaborative work of cells by using the collaboration function includes:

selecting a preset quantity of collaboration cells having highest priorities from each collaboration cell;

forming a second cell connection set by using the serving cell and the selected preset quantity of collaboration cells, and forming a second transmission scenario set by using the transmission scenario of the selected preset quantity of collaboration cells;

calling a corresponding collaboration function according to the second transmission scenario set; and performing collaborative work on the cells in the second cell connection set by using the collaboration function.

With reference to the seventh possible implementation manner of the second aspect, in an eighth possible implementation manner of the second aspect, the calling a corresponding collaboration function according to the second transmission scenario set includes:

acquiring the corresponding collaboration function from a correspondence between a transmission scenario set and the collaboration function according to the second transmission scenario set.

With reference to the second aspect, in a ninth possible implementation manner of the second aspect, the calling a collaboration function according to the transmission scenario of each collaboration cell, and implementing collaborative work of cells by using the collaboration function includes:

selecting a collaboration cell having a highest priority from each collaboration cell;

selecting a second preset quantity of collaboration cells having highest priorities from a collaboration cell having the same transmission scenario as the collaboration cell having the highest priority;

forming a third cell connection set by using the serving cell, the collaboration cell having the highest priority and the selected second preset quantity of collaboration cells, and forming a third transmission scenario set by using the transmission scenario of the collaboration cell having the highest priority;

calling a corresponding collaboration function according to the third transmission scenario set; and performing collaborative work on the cells in the third cell connection set by using the collaboration function.

With reference to the ninth possible implementation manner of the second aspect, in a tenth possible implementation manner of the second aspect, the calling a corresponding collaboration function according to the third transmission scenario set includes:

acquiring the corresponding collaboration function from a correspondence between a transmission scenario set and the collaboration function according to the third transmission scenario set.

According to a third aspect, the present invention provides an apparatus for implementing collaborative work of cells, where the apparatus includes a memory and a processor, and the memory stores an instruction to enable the processor to execute the method for implementing collaborative work of cells according to the second aspect.

In embodiments of the present invention, according to a transmission delay and a transmission bandwidth that are of a serving cell and a transmission delay and a transmission bandwidth that are of at least one collaboration cell, a transmission scenario of each collaboration cell is separately acquired, a different collaboration function is adaptively called according to the transmission scenario of each collaboration cell, and a cell that meets a delay requirement and a bandwidth requirement is adaptively selected, according to a system transmission condition, to participate in the collaboration function, which ensures normal work of the collaboration function and enables the collaboration function to produce a maximum collaboration function gain.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

In the embodiments of the present invention, a serving cell refers to a cell that performs joint processing on data of the cell and data of a specific neighboring cell of the cell, and a collaboration cell refers to a cell that is a neighboring cell of the serving cell and that transmits data to the serving cell to be jointly processed. A collaboration function apparatus is generally deployed in the serving cell, and data of multiple collaboration cells is transmitted to the serving cell. The serving cell performs joint processing on the data of the serving cell and the data of the multiple collaboration cells by using the deployed collaboration function apparatus, which can implement collaborative work of cells.

The apparatus for implementing collaborative work of cells provided by the embodiments of the present invention is applicable to any system that performs collaborative work, such as a second generation mobile communications technology, a third generation mobile communications technology, a fourth generation mobile communications technology, and a communications technology using spectrum spreading.

Figure 1:
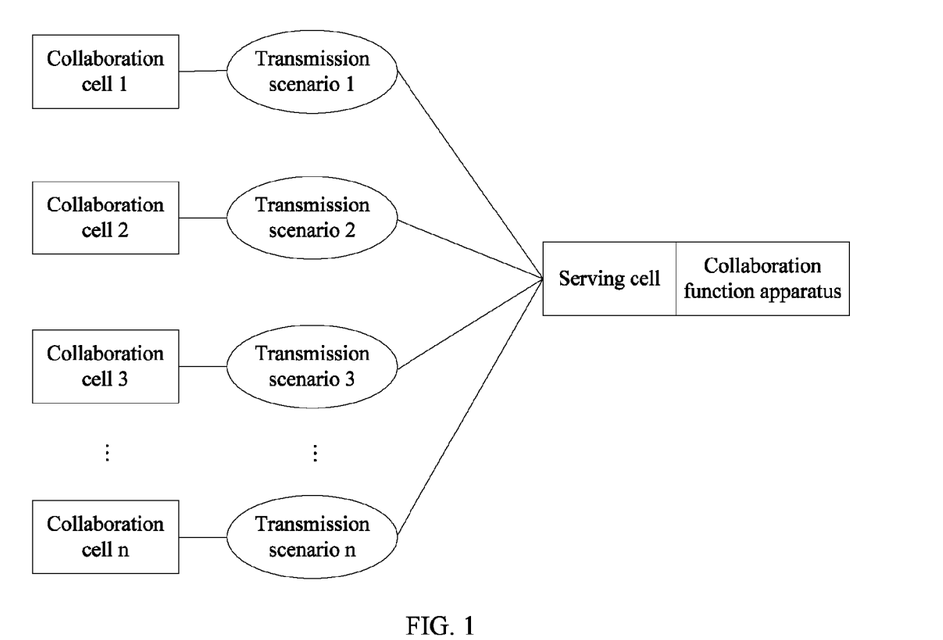
FIG. 1 is an application scenario diagram of implementing collaborative work of cells according to an embodiment of the present invention.

In the embodiments of the present invention, the collaboration function apparatus is an independent apparatus that may communicate with a base station, and the collaboration function apparatus acquires a transmission scenario between a serving cell and a collaboration cell according to a transmission delay and a transmission bandwidth that are of the serving cell and a transmission delay and a transmission bandwidth that are of the collaboration cell. The collaboration function apparatus is called according to the transmission scenario between the serving cell and the collaboration cell, as shown in FIG. 1. A transmission scenario between collaboration cell 1 and the serving cell is transmission scenario 1, a transmission scenario between collaboration cell 2 and the serving cell is transmission scenario 2, and a transmission scenario between collaboration cell 3 and the serving cell is transmission scenario 3, and the like.

Embodiment 1

Figure 2:
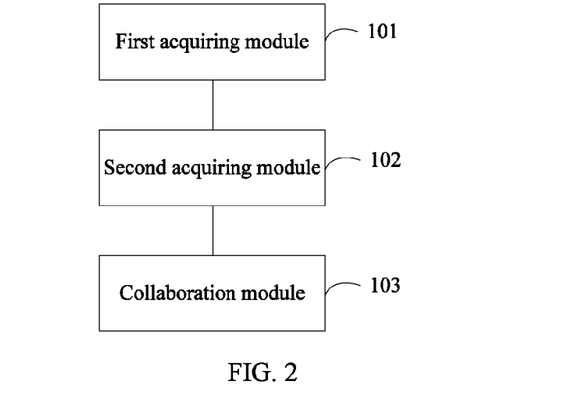
FIG. 2 is a schematic structural diagram of an apparatus for implementing collaborative work of cells according to Embodiment 1 of the present invention.

This embodiment of the present invention provides an apparatus for implementing collaborative work of cells. Referring to FIG. 2, the apparatus includes: a first acquiring module 101, a second acquiring module 102 and a collaboration module 103.

The first acquiring module 101 is configured to acquire a transmission delay and a transmission bandwidth that are of a serving cell and a transmission delay and a transmission bandwidth that are of at least one collaboration cell.

A cell that performs joint processing on data is referred to as a serving cell, a collaboration function apparatus is generally deployed in the serving cell, and a cell whose data is jointly processed is referred to as a collaboration cell. In addition, the serving cell and the collaboration cell are managed by different base stations, and the serving cell and the collaboration cell are neighboring cells.

A base station controller may divide a base station into multiple areas in advance, and in each area, a cell that meets a preset condition is used as a serving cell, and the other one or more cells in the area are used as one or more collaboration cells. The preset condition may include that a data processing capability of the serving cell exceeds a threshold, and the like.

A method used by the first acquiring module 101 to acquire the transmission delay and the transmission bandwidth is any one of existing methods for acquiring a transmission delay and a transmission bandwidth. In this embodiment of the present invention, the method used by the first acquiring module 101 to acquire the transmission delay and the transmission bandwidth is not described in detail. For example, the base station stores the transmission delay and the transmission bandwidth that are of the serving cell and the transmission delay and the transmission bandwidth that are of the at least one collaboration cell; the first acquiring module 101 sends an acquisition request to the base station, where the acquisition request carries an identifier of the serving cell and an identifier of the at least one collaboration cell; the base station acquires the transmission delay and the transmission bandwidth that are of the serving cell according to the identifier of the serving cell, and sends the transmission delay and the transmission bandwidth that are of the serving cell to the first acquiring module 101; the base station acquires the transmission delay and the transmission bandwidth that are of the at least one collaboration cell according to the identifier of the at least one collaboration cell, and sends the transmission delay and the transmission bandwidth that are of the at least one collaboration cell to the first acquiring module 101.

The second acquiring module 102 is configured to separately acquire a transmission scenario of each collaboration cell of the at least one collaboration cell according to the transmission delay and the transmission bandwidth that are of the serving cell and a transmission delay and a transmission bandwidth that are of each collaboration cell.

The collaboration module 103 is configured to call a collaboration function according to the transmission scenario of each collaboration cell, and implement collaborative work of cells by using the collaboration function.

Each collaboration function is corresponding to a first transmission delay range and a first transmission bandwidth range, and a second transmission delay range and a second transmission bandwidth range, where the first transmission delay range and the first transmission bandwidth range are requirements of the collaboration function on the transmission delay and the transmission bandwidth that are of the serving cell, and the second transmission delay range and the second transmission bandwidth range are requirements of the collaboration function on the transmission delay and the transmission bandwidth that are of the collaboration cell. According to the first transmission delay range, the first transmission bandwidth range, the second transmission delay range and the second transmission bandwidth range, at least one transmission scenario that is between the serving cell and the collaboration cell and that the collaboration function is applicable to, that is, at least one transmission scenario of the collaboration cell, may be determined, and a correspondence between the collaboration function and the at least one transmission scenario of the collaboration cell is stored.

Further, the second acquiring module 102 includes: a first acquiring unit, a second acquiring unit and a third acquiring unit.

The first acquiring unit is configured to acquire a transmission type of the serving cell according to the transmission delay and the transmission bandwidth that are of the serving cell.

The second acquiring unit is configured to separately acquire a transmission type of each collaboration cell according to the transmission delay and the transmission bandwidth that are of each collaboration cell.

The third acquiring unit is configured to separately acquire the transmission scenario of each collaboration cell according to the transmission type of the serving cell and the transmission type of each collaboration cell.

Further, the first acquiring unit includes: a first determining subunit and a first acquiring subunit.

The first determining subunit is configured to determine a transmission delay range and a transmission bandwidth range that are of the serving cell according to the transmission delay and the transmission bandwidth that are of the serving cell.

The transmission delay range and the transmission bandwidth range are stored in advance. The first determining subunit may determine, according to the transmission delay and the transmission delay range that are of the serving cell, the transmission delay range that the transmission delay of the serving cell belongs to; and the first determining subunit may determine, according to the transmission bandwidth and the transmission bandwidth range that are of the serving cell, the transmission bandwidth range that the transmission bandwidth of the serving cell belongs to.

The first acquiring subunit is configured to acquire the transmission type of the serving cell from a correspondence among the transmission delay range, the transmission bandwidth range, and the transmission type according to the transmission delay range and the transmission bandwidth range that are of the serving cell.

The correspondence among the transmission delay range, the transmission bandwidth range, and the transmission type is stored in advance. The first acquiring subunit may acquire, according to the transmission delay range and the transmission bandwidth range that are of the serving cell, the transmission type corresponding to the transmission delay range and the transmission bandwidth range that are of the serving cell from the correspondence among the transmission delay range, the transmission bandwidth range, and the transmission type.

Further, the second acquiring unit includes: a second determining subunit and a second acquiring subunit.

The second determining subunit is configured to separately determine a transmission delay range and a transmission bandwidth range that are of each collaboration cell according to the transmission delay and the transmission bandwidth that are of each collaboration cell.

The transmission delay range and the transmission bandwidth range are stored in advance. The second determining subunit may separately determine, according to the transmission delay and the transmission delay range that are of each collaboration cell, the transmission delay range that the transmission delay of each collaboration cell belongs to; and the second determining subunit may separately determine the transmission bandwidth range of each collaboration cell according to the transmission bandwidth and the transmission bandwidth range that are of each collaboration cell.

The second acquiring subunit is configured to separately acquire the transmission type of each collaboration cell from a correspondence among the transmission delay range, the transmission bandwidth range, and the transmission type according to the transmission delay range and the transmission bandwidth range that are of each collaboration cell.

The correspondence among the transmission delay range, the transmission bandwidth range, and the transmission type is stored in advance. The second acquiring subunit may separately acquire, according to the transmission delay range and the transmission bandwidth range that are of each collaboration cell, the transmission type corresponding to the transmission delay range and the transmission bandwidth range that are of each collaboration cell from the correspondence among the transmission delay range, the transmission bandwidth range, and the transmission type.

Further, the third acquiring unit is configured to separately acquire the transmission scenario of each collaboration cell from a correspondence among the transmission type of the serving cell, the transmission type of the collaboration cell, and the transmission scenario according to the transmission type of the serving cell and the transmission type of each collaboration cell.

The correspondence among the transmission type of the serving cell, the transmission type of the collaboration cell, and the transmission scenario is stored in advance. The third acquiring unit separately acquires the transmission scenario of each collaboration cell from the correspondence among the transmission type of the serving cell, the transmission type of the collaboration cell, and the transmission scenario according to the transmission type of the serving cell and the transmission type of each collaboration cell.

The transmission scenario is defined according to a transmission condition difference between the serving cell and the collaboration cell. A transmission condition between the serving cell and the collaboration cell may determine the transmission delay and the transmission bandwidth that are of the serving cell and the transmission delay and the transmission bandwidth that are of the collaboration cell, and therefore, the transmission scenario is essentially determined according to the transmission delay and the transmission bandwidth that are of the serving cell and the transmission delay and the transmission bandwidth that are of the collaboration cell. The transmission scenario of each collaboration cell in this embodiment of the present invention is the transmission scenario between each collaboration cell and the serving cell.

Further, the collaboration module 103 includes: a first selection unit, a first formation unit, a first call unit and a first collaboration unit.

The first selection unit is configured to select a collaboration cell having a same transmission scenario from each collaboration cell.

Specifically, the first selection unit selects the collaboration cell having the same transmission scenario from the each collaboration cell according to the transmission scenario of each collaboration cell.

The quantity of collaboration cells may be set and modified according to needs of the collaboration function.

The first formation unit is configured to form a first cell connection set by using the serving cell and the selected collaboration cell, and form a first transmission scenario set by using the transmission scenario of the selected collaboration cell.

A transmission scenario set includes at least one transmission scenario, and the first transmission scenario set includes one transmission scenario.

The first call unit is configured to call a corresponding collaboration function according to the first transmission scenario set.

The first call unit is specifically configured to acquire the corresponding collaboration function from a correspondence between the transmission scenario set and the collaboration function according to the first transmission scenario set.

The correspondence between the transmission scenario set and the collaboration function is stored in advance. The collaboration function corresponding to the first transmission scenario set is acquired from the correspondence between the transmission scenario set and the collaboration function according to the first transmission scenario set.

The first collaboration unit is configured to perform collaborative work on the cells in the first cell connection set by using the collaboration function.

Specifically, the collaboration cell in the first cell connection set sends data to the serving cell in the first cell connection set, and the serving cell in the first cell connection set receives the data sent by the collaboration cell in the first cell connection set and performs collaboration processing on the received data.

Further, the collaboration module 103 may further include: a second selection unit, a second formation unit, a second call unit and a second collaboration unit.

The second selection unit is configured to select a first preset quantity of collaboration cells having highest priorities from each collaboration cell.

Specifically, a priority of each collaboration cell is stored in advance, and the first preset quantity of collaboration cells having highest priorities are selected from each collaboration cell according to the priority of each collaboration cell.

The first preset quantity may be set and modified according to needs of the collaboration function. In this embodiment of the present invention, the first preset quantity is not specifically limited. For example, the first preset quantity is one, two or the like.

The second formation unit is configured to form a second cell connection set by using the serving cell and the selected first preset quantity of collaboration cells, and form a second transmission scenario set by using the transmission scenario of the selected first preset quantity of collaboration cells.

The second transmission scenario set includes at least one transmission scenario.

The second call unit is configured to call a corresponding collaboration function according to the second transmission scenario set.

The second call unit is specifically configured to acquire the corresponding collaboration function from a correspondence between the transmission scenario set and the collaboration function according to the second transmission scenario set.

Specifically, the correspondence between the transmission scenario set and the collaboration function is stored in advance. The collaboration function corresponding to the second transmission scenario set is acquired from the correspondence between the transmission scenario set and the collaboration function according to the second transmission scenario set.

The second collaboration unit is configured to perform collaborative work on the cells in the second cell connection set by using the collaboration function.

Specifically, the collaboration cell in the second cell connection set sends data to the serving cell in the second cell connection set, and the serving cell in the second cell connection set receives the data sent by the collaboration cell in the second cell connection set and performs collaboration processing on the received data.

Further, the collaboration module 103 further includes: a third selection unit, a fourth selection unit, a third formation unit, a third call unit and a third collaboration unit.

The third selection unit is configured to select a collaboration cell having a highest priority from each collaboration cell.

Specifically, a priority of each collaboration cell is stored in advance, and the third selection unit selects the collaboration cell having the highest priority from each collaboration cell according to the priority of each collaboration cell.

The fourth selection unit is configured to select a second preset quantity of collaboration cells having highest priorities from a collaboration cell having the same transmission scenario as the collaboration cell having the highest priority.

Specifically, the fourth selection unit acquires, according to the transmission scenario of the collaboration cell having the highest priority, the collaboration cell having the same transmission scenario as the collaboration cell having the highest priority, and selects the second preset quantity of collaboration cells having highest priorities from the acquired collaboration cell.

The second preset quantity may be set and modified according to needs of the collaboration function. In this embodiment of the present invention, the second preset quantity is not specifically limited. For example, the second preset quantity is one, two or the like.

The third formation unit is configured to form a third cell connection set by using the serving cell, the collaboration cell having the highest priority and the selected second preset quantity of collaboration cells, and form a third transmission scenario set by using the transmission scenario of the collaboration cell having the highest priority.

The third transmission scenario set includes one transmission scenario.

The third call unit is configured to call a corresponding collaboration function according to the third transmission scenario set.

The third call unit is configured to acquire the corresponding collaboration function from a correspondence between the transmission scenario set and the collaboration function according to the third transmission scenario set.

Specifically, the correspondence between the transmission scenario set and the collaboration function is stored in advance. The third call unit acquires the collaboration function corresponding to the third transmission scenario set from the correspondence between the transmission scenario set and the collaboration function according to the third transmission scenario set.

The third collaboration unit is configured to perform collaborative work on the cells in the third cell connection set by using the collaboration function.

Specifically, the collaboration cell in the third cell connection set sends data to the serving cell in the third cell connection set, and the serving cell in the third cell connection set receives the data sent by the collaboration cell in the third cell connection set and performs collaboration processing on the received data.

In this embodiment of the present invention, according to a transmission delay and a transmission bandwidth that are of a serving cell and a transmission delay and a transmission bandwidth that are of at least one collaboration cell, a transmission scenario of each collaboration cell is separately acquired, a different collaboration function is adaptively called according to the transmission scenario of each collaboration cell, and a cell that meets a delay requirement and a bandwidth requirement is adaptively selected, according to a system transmission condition, to participate in the collaboration function, which ensures normal work of the collaboration function and enables the collaboration function to produce a maximum collaboration function gain.

Embodiment 2

Figure 3:
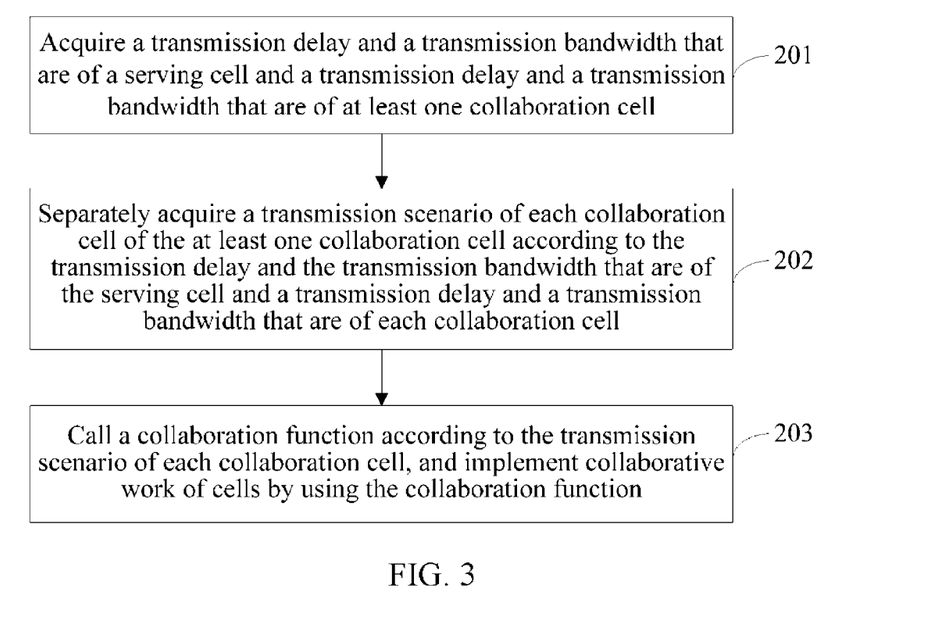
FIG. 3 is a flowchart of a method for implementing collaborative work of cells according to Embodiment 2 of the present invention.

This embodiment of the present invention provides a method for implementing collaborative work of cells. Referring to FIG. 3, the method includes:

Step 201: Acquire a transmission delay and a transmission bandwidth that are of a serving cell and a transmission delay and a transmission bandwidth that are of at least one collaboration cell.

Step 202: Separately acquire a transmission scenario of each collaboration cell of the at least one collaboration cell according to the transmission delay and the transmission bandwidth that are of the serving cell and a transmission delay and a transmission bandwidth that are of each collaboration cell.

Step 203: Call a collaboration function according to the transmission scenario of each collaboration cell, and implement collaborative work of cells by using the collaboration function.

In this embodiment of the present invention, according to a transmission delay and a transmission bandwidth that are of a serving cell and a transmission delay and a transmission bandwidth that are of at least one collaboration cell, a transmission scenario of each collaboration cell is separately acquired, a different collaboration function is adaptively called according to the transmission scenario of each collaboration cell, and a cell that meets a delay requirement and a bandwidth requirement is adaptively selected, according to a system transmission condition, to participate in the collaboration function, which ensures normal work of the collaboration function and enables the collaboration function to produce a maximum collaboration function gain.

Embodiment 3

Figure 4:
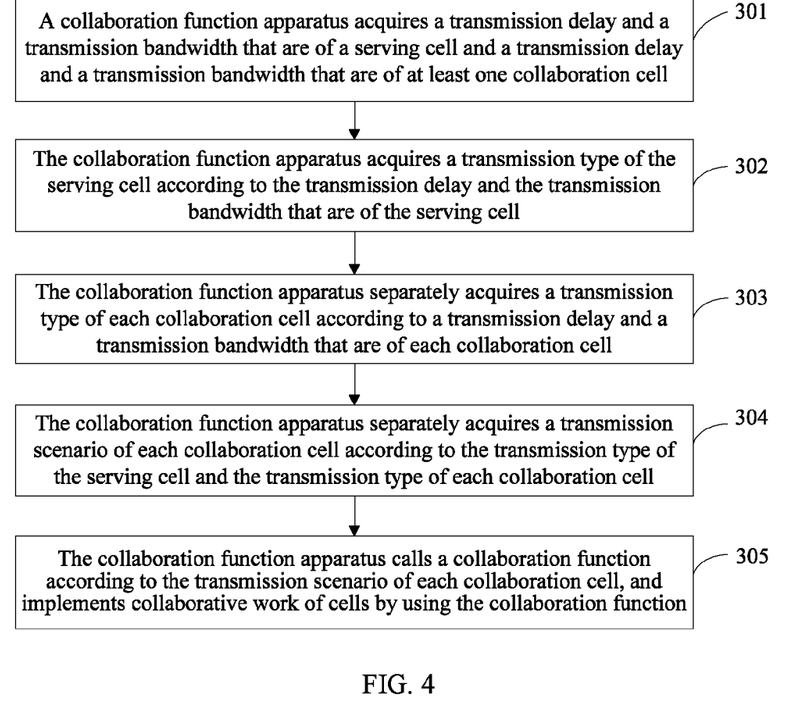
FIG. 4 is a flowchart of a method for implementing collaborative work of cells according to Embodiment 3 of the present invention.

This embodiment of the present invention provides a method for implementing collaborative work of cells. A transmission delay and a transmission bandwidth that are of a cell are changeable, and therefore, a serving cell may periodically select a collaboration cell by using the method provided by this embodiment of the present invention, form a cell connection set by using the selected collaboration cell and the serving cell, select a collaboration function, and perform collaborative work on the cells in the cell connection set by using the selected collaboration function. Referring to FIG. 4, the method includes:

Step 301: A collaboration function apparatus acquires a transmission delay and a transmission bandwidth that are of a serving cell and a transmission delay and a transmission bandwidth that are of at least one collaboration cell.

The collaboration function apparatus refers to an apparatus with a collaboration function;

and the collaboration function refers to that a cell performs joint processing on data of multiple cells, where a cell that performs the joint processing on data is referred to as a serving cell, the collaboration function apparatus is generally deployed in the serving cell, and a cell whose data is jointly processed is referred to as a collaboration cell. In addition, the serving cell and the collaboration cell are managed by different base stations, and the serving cell and the collaboration cell are neighboring cells.

A base station controller may divide a base station into multiple areas in advance, and in each area, a cell that meets a preset condition is used as a serving cell, and the other one or more cells in the area are used as one or more collaboration cells. The preset condition may include that a data processing capability of the serving cell exceeds a threshold, and the like.

A method used by the collaboration function apparatus to acquire the transmission delay and the transmission bandwidth in step 301 is any one of existing methods for acquiring a transmission delay and a transmission bandwidth. In this embodiment of the present invention, the method used by the collaboration function apparatus to acquire the transmission delay and the transmission bandwidth is not described in detail. For example, the base station stores the transmission delay and the transmission bandwidth that are of the serving cell and the transmission delay and the transmission bandwidth that are of the at least one collaboration cell; the collaboration function apparatus sends an acquisition request to the base station, where the acquisition request carries an identifier of the serving cell and an identifier of the at least one collaboration cell; the base station acquires the transmission delay and the transmission bandwidth that are of the serving cell according to the identifier of the serving cell, and sends the transmission delay and the transmission bandwidth that are of the serving cell to the collaboration function apparatus; the base station acquires the transmission delay and the transmission bandwidth that are of the at least one collaboration cell according to the identifier of the at least one collaboration cell, and sends the transmission delay and the transmission bandwidth that are of the at least one collaboration cell to the collaboration function apparatus.

Step 302: The collaboration function apparatus acquires a transmission type of the serving cell according to the transmission delay and the transmission bandwidth that are of the serving cell.

Step 302 may include the following steps (1) and (2):

(1) The collaboration function apparatus determines a transmission delay range and a transmission bandwidth range that are of the serving cell according to the transmission delay and the transmission bandwidth that are of the serving cell.

The transmission delay range and the transmission bandwidth range are stored in advance in the collaboration function apparatus. The transmission delay range that the transmission delay of the serving cell belongs to may be determined according to the transmission delay and the transmission delay range that are of the serving cell, and the transmission bandwidth range that the transmission bandwidth of the serving cell belongs to may be determined according to the transmission bandwidth and the transmission bandwidth range that are of the serving cell.

For example, a transmission delay range of transmission delay range 1 is 0 to 10 us, a transmission delay range of transmission delay range 2 is 10 us to 130 us, a transmission delay range of transmission delay range 3 is greater than 130 us, a transmission bandwidth range of transmission bandwidth range 1 is greater than 30 G, a transmission bandwidth range of transmission bandwidth range 2 is 10 G to 30 G, a transmission bandwidth range of transmission bandwidth range 3 is less than 10 G, the transmission delay of the serving cell is 8 us, and the transmission bandwidth of the serving cell is 40 G. The transmission delay of the serving cell is in transmission delay range 1, and the transmission bandwidth of the serving cell is in transmission bandwidth range 1, and therefore, the collaboration function apparatus may determine that the transmission delay range of the serving cell is transmission delay range 1, and the transmission bandwidth range of the serving cell is transmission bandwidth range 1.

(2) The collaboration function apparatus acquires the transmission type of the serving cell from a correspondence among the transmission delay range, the transmission bandwidth range, and the transmission type according to the transmission delay range and the transmission bandwidth range that are of the serving cell.

Specifically, the correspondence among the transmission delay range, the transmission bandwidth range, and the transmission type is stored in advance in the collaboration function apparatus, and the transmission type corresponding to the transmission delay range and the transmission bandwidth range that are of the serving cell is acquired from the correspondence among the transmission delay range, the transmission bandwidth range, and the transmission type according to the transmission delay range and the transmission bandwidth range that are of the serving cell.

The collaboration function apparatus may store the correspondence among the transmission delay range, the transmission bandwidth range, and the transmission type in a form of a table, for example, as shown in Table 1.

TABLE 1

| Transmission Delay Range | Transmission Bandwidth Range | Transmission Type |
| --- | --- | --- |
| 0 to 10 us | Greater than 30 G | Transmission type 1 |
| 10 us to 130 us | 10 G to 30 G | Transmission type 2 |
| Greater than 130 us | Less than 10 G | Transmission type 3 |

Because the transmission delay of the serving cell is within 0 to 10 us, and the transmission bandwidth of the serving cell is greater than 30 G, the collaboration function apparatus acquires, according to the transmission delay range of the serving cell: 0 to 10 us and the transmission bandwidth range of the serving cell: greater than 30 G, the transmission type, being transmission type 1, of the serving cell from the correspondence among the transmission delay range, the transmission bandwidth range, and the transmission type.

Step 303: The collaboration function apparatus separately acquires a transmission type of each collaboration cell according to the transmission delay and the transmission bandwidth that are of each collaboration cell.

Step 303 may include the following steps (1) and (2):

(1) The collaboration function apparatus separately determines a transmission delay range and a transmission bandwidth range that are of each collaboration cell according to the transmission delay and the transmission bandwidth that are of each collaboration cell.

The transmission delay range and the transmission bandwidth range are stored in advance in the collaboration function apparatus. The transmission delay range that the transmission delay of each collaboration cell belongs to may be separately determined according to the transmission delay and the transmission delay range that are of each collaboration cell; and the transmission bandwidth range of each collaboration cell may be separately determined according to the transmission bandwidth and the transmission bandwidth range that are of each collaboration cell.

(2) The collaboration function apparatus separately acquires the transmission type of each collaboration cell from a correspondence among the transmission delay range, the transmission bandwidth range, and the transmission type according to the transmission delay range and the transmission bandwidth range that are of each collaboration cell.

Specifically, the correspondence among the transmission delay range, the transmission bandwidth range, and the transmission type is stored in advance in the collaboration function apparatus, and the transmission type corresponding to the transmission delay range and the transmission bandwidth range that are of each collaboration cell is separately acquired from the correspondence among the transmission delay range, the transmission bandwidth range, and the transmission type according to the transmission delay range and the transmission bandwidth range that are of each collaboration cell.

For example, a transmission delay of a collaboration cell is 5 us, and a transmission bandwidth of the collaboration cell is 50 G. The transmission delay of the collaboration cell is within transmission delay range 1, and the transmission bandwidth of the collaboration cell is within transmission bandwidth range 1, and therefore, the collaboration function apparatus may determine, according to Table 1, that a transmission delay range of the collaboration cell is transmission delay range 1, and a transmission bandwidth range of the collaboration cell is transmission bandwidth range 1.

Step 304: The collaboration function apparatus separately acquires a transmission scenario of each collaboration cell according to the transmission type of the serving cell and the transmission type of each collaboration cell.

Specifically, a correspondence among the transmission type of the serving cell, the transmission type of the collaboration cell, and the transmission scenario is stored in advance in the collaboration function apparatus. The transmission scenario of each collaboration cell is separately acquired from the correspondence among the transmission type of the serving cell, the transmission type of the collaboration cell, and the transmission scenario according to the transmission type of the serving cell and the transmission type of each collaboration cell.

The transmission scenario is defined according to a transmission condition difference between the serving cell and the collaboration cell. A transmission condition between the serving cell and the collaboration cell may determine the transmission delay and the transmission bandwidth that are of the serving cell and the transmission delay and the transmission bandwidth that are of the collaboration cell, and therefore, the transmission scenario is essentially determined according to the transmission delay and the transmission bandwidth that are of the serving cell and the transmission delay and the transmission bandwidth that are of the collaboration cell. The transmission scenario of each collaboration cell in this embodiment of the present invention is the transmission scenario between each collaboration cell and the serving cell, and the collaboration function apparatus may store the correspondence among the transmission type of the serving cell, the transmission type of the collaboration cell, and the transmission scenario in a form of a table, for example, as shown in Table 2.

TABLE 2

| Transmission Type of Serving Cell | Transmission Type of Collaboration Cell | Transmission Scenario |
| --- | --- | --- |
| Transmission type 1 | Transmission type 1 | Transmission scenario 1 |
| Transmission type 2 | Transmission type 2 | Transmission scenario 2 |
| . . . | . . . | . . . |

For example, the transmission type of the serving cell is transmission type 1, and the transmission type of the collaboration cell is transmission type 1, and therefore, the collaboration function apparatus acquires, according to transmission type 1 of the serving cell and transmission type 1 of the collaboration cell, the transmission scenario, being transmission scenario 1, between the collaboration cell and the serving cell from the correspondence among the transmission type of the serving cell, the transmission type of the collaboration cell, and the transmission scenario of the collaboration cell.

Step 305: The collaboration function apparatus calls a collaboration function according to the transmission scenario of each collaboration cell, and implements collaborative work of cells by using the collaboration function.

Each collaboration function is corresponding to a first transmission delay range and a first transmission bandwidth range, and a second transmission delay range and a second transmission bandwidth range, where the first transmission delay range and the first transmission bandwidth are requirements of the collaboration function on the transmission delay and the transmission bandwidth that are of the serving cell, and the second transmission delay range and the second transmission bandwidth range are requirements of the collaboration function on the transmission delay and the transmission bandwidth that are of the collaboration cell; according to the first transmission delay range, the first transmission bandwidth range, the second transmission delay range and the second transmission bandwidth range, at least one transmission scenario that is between the serving cell and the collaboration cell and that the collaboration function is applicable to, that is, at least one transmission scenario of the collaboration cell, may be determined, and a correspondence between the collaboration function and the at least one transmission scenario of the collaboration cell is stored.

Step 305 may be implemented by using the following first manner, second manner or third manner. The first manner includes the following steps (1) to (4):

(1) The collaboration function apparatus selects a collaboration cell having a same transmission scenario from each collaboration cell.

Specifically, the collaboration function apparatus selects the collaboration cell having the same transmission scenario from each collaboration cell according to the transmission scenario of each collaboration cell.

The quantity of collaboration cells may be set and modified according to needs of the collaboration function. For example, when the collaboration function supports two collaboration cells, two collaboration cells having a same transmission scenario are selected from each collaboration cell, and if there are no two collaboration cells having a same transmission scenario in each collaboration cell, one collaboration cell may be selected from each collaboration cell.

For example, collaboration cells that may perform collaboration with the serving cell are collaboration cell 1, collaboration cell 2, collaboration cell 3, collaboration cell 4, collaboration cell 5 and collaboration cell 6, a transmission scenario of collaboration cell 1 and a transmission scenario of collaboration cell 6 are transmission scenario 1, a transmission scenario of collaboration cell 2 and a transmission scenario of collaboration cell 4 are transmission scenario 2, and a transmission scenario of collaboration cell 3 and a transmission scenario of collaboration cell 5 are transmission scenario 3. Collaboration cells having a same transmission scenario are selected to perform collaboration. That the quantity of collaboration cells performing collaborative work is two is used as an example for description, and collaboration cells having a same transmission scenario are selected to perform collaboration, that is, collaboration cell 1 and collaboration cell 6 are selected to perform collaboration, or collaboration cell 2 and collaboration cell 4 are selected to perform collaboration, or collaboration cell 3 and collaboration cell 5 are selected to perform collaboration.

(2) Form a first cell connection set by using the serving cell and the selected collaboration cell, and form a first transmission scenario set by using the transmission scenario of the selected collaboration cell.

A transmission scenario set includes at least one transmission scenario, and in this step, the first transmission scenario set includes one transmission scenario.

The foregoing collaboration cell 1 to collaboration cell 6 are still used as an example. For example, the first cell connection set includes the serving cell, collaboration cell 1 and collaboration cell 6, and the first transmission scenario set includes transmission scenario 1; or the first cell connection set includes the serving cell, collaboration cell 2 and collaboration cell 4, and the first transmission scenario set includes transmission scenario 2; or the first cell connection set includes collaboration cell 3 and collaboration cell 5, and the first transmission scenario set includes transmission scenario 3.

(3) The collaboration function apparatus calls a corresponding collaboration function according to the first transmission scenario set.

Specifically, a correspondence between the transmission scenario set and the collaboration function is stored in advance in the collaboration function apparatus, and the collaboration function corresponding to the first transmission scenario set is acquired from the correspondence between the transmission scenario set and the collaboration function according to the first transmission scenario set.

The collaboration function apparatus may store the correspondence between the transmission scenario set and the collaboration function in a form of a table, for example, as shown in Table 3.

TABLE 3

| Transmission Scenario Set | Collaboration Function |
|---|---|
| Transmission scenario set 1 | Collaboration function 1 |
| Transmission scenario set 2 | Collaboration function 2 |
| ... | ... |

For example, the first transmission scenario set is transmission scenario set 1, which includes transmission scenario 1, and a collaboration function corresponding to transmission scenario set 1 is collaboration function 1. The collaboration function apparatus acquires, according to transmission scenario set 1, collaboration function 1 corresponding to transmission scenario set 1 from the correspondence between the transmission scenario set and the collaboration function.

It should be noted that, in this embodiment of the present invention, the transmission scenario between the serving cell and the collaboration cell may be determined according to the transmission delay and the transmission bandwidth that are of the serving cell and the transmission delay and the transmission bandwidth that are of the collaboration cell, and then the collaboration function is called according to the transmission scenario between the serving cell and the collaboration cell.

(4) The collaboration function apparatus performs collaborative work on the cells in the first cell connection set by using the collaboration function.

Specifically, the collaboration cell in the first cell connection set sends data to the serving cell in the first cell connection set, and the serving cell in the first cell connection set receives the data sent by the collaboration cell in the first cell connection set and performs collaboration processing on the received data.

For example, the serving cell performs collaborative work on the cells in cell connection set 1 by using collaboration function 1, that is, collaboration cell 1 and collaboration cell 6 send data to the serving cell, and the serving cell receives the data sent by collaboration cell 1 and collaboration cell 6 and processes the received data in a collaboration manner specified by collaboration function 1.

The second manner includes the following steps (A) to (D):

(A) The collaboration function apparatus selects a first preset quantity of collaboration cells having highest priorities from each collaboration cell.

Specifically, a priority of each collaboration cell is stored in advance in the collaboration function apparatus, and the first preset quantity of collaboration cells having highest priorities are selected from each collaboration cell according to the priority of each collaboration cell.

The first preset quantity may be set and modified according to needs of the collaboration function. In this embodiment of the present invention, the first preset quantity is not specifically limited. For example, the first preset quantity is one, two or the like.

For example, collaboration cells that are applicable to performing collaboration with the serving cell and that are listed in descending order of priorities are: collaboration cell 1, collaboration cell 2, collaboration cell 3, collaboration cell 4, collaboration cell 5 and collaboration cell 6, a transmission scenario of collaboration cell 1 and a transmission scenario of collaboration cell 6 are transmission scenario 1, a transmission scenario of collaboration cell 2 and a transmission scenario of collaboration cell 4 are transmission scenario 2, and a transmission scenario of collaboration cell 3 and a transmission scenario of collaboration cell 5 are transmission scenario 3. That the first preset quantity is two is used as an example for description, and two collaboration cells having highest priorities, collaboration cell 1 and collaboration cell 2, are selected to perform collaboration.

(B) The collaboration function apparatus forms a second cell connection set by using the serving cell and the selected first preset quantity of collaboration cells, and forms a second transmission scenario set by using the transmission scenario of the selected first preset quantity of collaboration cells.

In this step, the second transmission scenario set includes at least one transmission scenario.

For example, the second cell connection set includes the serving cell, collaboration cell 1 and collaboration cell 2; and the second transmission scenario set includes transmission scenario 1 and transmission scenario 2.

(C) The collaboration function apparatus calls a corresponding collaboration function according to the second transmission scenario set.

Specifically, a correspondence between the transmission scenario set and the collaboration function is stored in advance in the collaboration function apparatus, and the collaboration function corresponding to the second transmission scenario set is acquired from the correspondence between the transmission scenario set and the collaboration function according to the second transmission scenario set.

For example, the second transmission scenario set is transmission scenario set 2, which includes transmission scenario 1 and transmission scenario 2, and collaboration function 2 corresponding to transmission scenario set 2 is acquired from the correspondence between the transmission scenario set and the collaboration function according to transmission scenario set 2.

(D) The collaboration function apparatus performs collaborative work on the cells in the second cell connection set by using the collaboration function.

Specifically, the collaboration cell in the second cell connection set sends data to the serving cell in the second cell connection set, and the serving cell in the second cell connection set receives the data sent by the collaboration cell in the second cell connection set and performs collaboration processing on the received data.

For example, the second cell connection set is cell connection set 2, and the serving cell performs collaborative work on the cells in cell connection set 2 by using collaboration function 2, that is, collaboration cell 1 and collaboration cell 2 send data to the serving cell, and the serving cell receives the data sent by collaboration cell 1 and collaboration cell 2 and processes the received data in a collaboration manner specified by collaboration function 2.

The third manner includes the following steps (a) to (e):

(a) The collaboration function apparatus selects a collaboration cell having a highest priority from each collaboration cell.

Specifically, a priority of each collaboration cell is stored in advance in the collaboration function apparatus, and the collaboration cell having the highest priority is selected from each collaboration cell according to the priority of each collaboration cell.

(b) The collaboration function apparatus selects a second preset quantity of collaboration cells having highest priorities from a collaboration cell having a same transmission scenario as the collaboration cell having the highest priority.

Specifically, the collaboration function apparatus acquires, according to the transmission scenario of the collaboration cell having the highest priority, the collaboration cell having the same transmission scenario as the collaboration cell having the highest priority, and selects the second preset quantity of collaboration cells having highest priorities from the acquired collaboration cell.

The second preset quantity may be set and modified according to needs of the collaboration function. In this embodiment of the present invention, the second preset quantity is not specifically limited. For example, the second preset quantity is one, two or the like.

For example, collaboration cells that may perform collaboration with the serving cell and that are listed in descending order of priorities are: collaboration cell 1, collaboration cell 2, collaboration cell 3, collaboration cell 4, collaboration cell 5 and collaboration cell 6, a transmission scenario of collaboration cell 1 and a transmission scenario of collaboration cell 6 are transmission scenario 1, a transmission scenario of collaboration cell 2 and a transmission scenario of collaboration cell 4 are transmission scenario 2, and a transmission scenario of collaboration cell 3 and a transmission scenario of collaboration cell 5 are transmission scenario 3. That the collaboration function supports two collaboration cells is used as an example for description, and the second preset quantity is one, a collaboration cell having a highest priority, that is, collaboration cell 1, is selected, and one collaboration cell having a highest priority is selected from a collaboration cell having a same transmission scenario as collaboration cell 1 to perform collaboration, that is, collaboration cell 6 may be selected to perform collaboration.

(c) The collaboration function apparatus forms a third cell connection set by using the serving cell, the collaboration cell having the highest priority and the selected second preset quantity of collaboration cells, and forms a third transmission scenario set by using the transmission scenario of the collaboration cell having the highest priority.

In this step, the third transmission scenario set includes one transmission scenario.

For example, the third cell connection set includes the serving cell, collaboration cell 1 and collaboration cell 6; the third transmission scenario set includes transmission scenario 1.

(d) The collaboration function apparatus calls a corresponding collaboration function according to the third transmission scenario set.

Specifically, a correspondence between the transmission scenario set and the collaboration function is stored in advance in the collaboration function apparatus, and the collaboration function corresponding to the third transmission scenario set is acquired from the correspondence between the transmission scenario set and the collaboration function according to the third transmission scenario set.

For example, the third transmission scenario is transmission scenario 1, and collaboration function 1 corresponding to transmission scenario set 1 is acquired from the correspondence between the transmission scenario set and the collaboration function according to transmission scenario set 1.

(e) The collaboration function apparatus performs collaborative work on the cells in the third cell connection set by using the collaboration function.

Specifically, the collaboration cell in the third cell connection set sends data to the serving cell in the third cell connection set, and the serving cell in the third cell connection set receives the data sent by the collaboration cell in the third cell connection set and performs collaboration processing on the received data.

For example, the third cell connection set is cell connection set 3, and the serving cell performs collaborative work on the cells in cell connection set 3 by using collaboration function 1, that is, collaboration cell 1 and collaboration cell 6 send data to the serving cell, and the serving cell receives the data sent by collaboration cell 1 and collaboration cell 6 and processes the received data in a collaboration manner specified by collaboration function 1.

It should be noted that, in this embodiment of the present invention, the foregoing step 301 to step 305 are performed every a preset time. The preset time may be set and modified according to needs.

In this embodiment of the present invention, according to a transmission delay and a transmission bandwidth that are of a serving cell and a transmission delay and a transmission bandwidth that are of at least one collaboration cell, a transmission scenario of each collaboration cell is separately acquired, a different collaboration function is adaptively called according to the transmission scenario of each collaboration cell, and a cell that meets a delay requirement and a bandwidth requirement is adaptively selected, according to a system transmission condition, to participate in the collaboration function, which ensures normal work of the collaboration function and enables the collaboration function to produce a maximum collaboration function gain.

Embodiment 4

Figure 5:
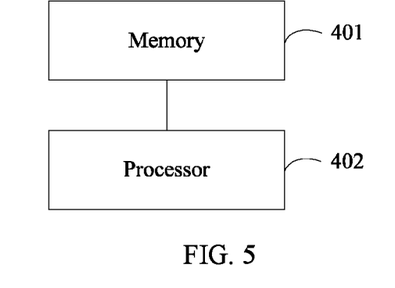
FIG. 5 is a schematic structural diagram of an apparatus for implementing collaborative work of cells according to Embodiment 4 of the present invention.

This embodiment of the present invention provides an apparatus for implementing collaborative work of cells. Referring to FIG. 5, the apparatus includes:

a memory 401 and a processor 402, where the memory 401 stores an instruction to enable the processor 402 to execute the following method for implementing collaborative work of cells:

acquiring a transmission delay and a transmission bandwidth that are of a serving cell and a transmission delay and a transmission bandwidth that are of at least one collaboration cell;

separately acquiring a transmission scenario of each collaboration cell of the at least one collaboration cell according to the transmission delay and the transmission bandwidth that are of the serving cell and a transmission delay and a transmission bandwidth that are of each collaboration cell; and calling a collaboration function according to the transmission scenario of each collaboration cell, and implementing collaborative work of cells by using the collaboration function.

Further, the separately acquiring a transmission scenario of each collaboration cell of the at least one collaboration cell according to the transmission delay and the transmission bandwidth that are of the serving cell and a transmission delay and a transmission bandwidth that are of each collaboration cell includes:

acquiring a transmission type of the serving cell according to the transmission delay and the transmission bandwidth that are of the serving cell;

separately acquiring a transmission type of each collaboration cell according to the transmission delay and the transmission bandwidth that are of each collaboration cell; and separately acquiring the transmission scenario of each collaboration cell according to the transmission type of the serving cell and the transmission type of each collaboration cell.

Further, the acquiring a transmission type of the serving cell according to the transmission delay and the transmission bandwidth that are of the serving cell includes:

determining a transmission delay range and a transmission bandwidth range that are of the serving cell according to the transmission delay and the transmission bandwidth that are of the serving cell; and acquiring the transmission type of the serving cell from a correspondence among the transmission delay range, the transmission bandwidth range, and the transmission type according to the transmission delay range and the transmission bandwidth range that are of the serving cell.

Further, the separately acquiring a transmission type of each collaboration cell according to the transmission delay and the transmission bandwidth that are of each collaboration cell includes:

separately determining a transmission delay range and a transmission bandwidth range that are of each collaboration cell according to the transmission delay and the transmission bandwidth that are of each collaboration cell; and separately acquiring the transmission type of each collaboration cell from a correspondence among the transmission delay range, the transmission bandwidth range, and the transmission type according to the transmission delay range and the transmission bandwidth range that are of each collaboration cell.

Further, the separately acquiring the transmission scenario of each collaboration cell according to the transmission type of the serving cell and the transmission type of each collaboration cell includes:

separately acquiring the transmission scenario of each collaboration cell from a correspondence among the transmission type of the serving cell, the transmission type of the collaboration cell, and the transmission scenario according to the transmission type of the serving cell and the transmission type of each collaboration cell.

Further, the calling a collaboration function according to the transmission scenario of each collaboration cell, and implementing collaborative work of cells by using the collaboration function includes:

selecting a collaboration cell having a same transmission scenario from each collaboration cell;

forming a first cell connection set by using the serving cell and the selected collaboration cell, and forming a first transmission scenario set by using the transmission scenario of the selected collaboration cell;

calling a corresponding collaboration function according to the first transmission scenario set; and performing collaborative work on the cells in the first cell connection set by using the collaboration function.

Further, the calling a corresponding collaboration function according to the first transmission scenario set includes:

acquiring the corresponding collaboration function from a correspondence between a transmission scenario set and the collaboration function according to the first transmission scenario set.

Further, the calling a collaboration function according to the transmission scenario of each collaboration cell, and implementing collaborative work of cells by using the collaboration function includes:

selecting a preset quantity of collaboration cells having highest priorities from each collaboration cell;

forming a second cell connection set by using the serving cell and the selected preset quantity of collaboration cells, and forming a second transmission scenario set by using the transmission scenario of the selected preset quantity of collaboration cells;

calling a corresponding collaboration function according to the second transmission scenario set; and performing collaborative work on the cells in the second cell connection set by using the collaboration function.

Further, the calling a corresponding collaboration function according to the second transmission scenario set includes:

acquiring the corresponding collaboration function from a correspondence between a transmission scenario set and the collaboration function according to the second transmission scenario set.

Further, the calling a collaboration function according to the transmission scenario of each collaboration cell, and implementing collaborative work of cells by using the collaboration function includes:

selecting a collaboration cell having a highest priority from each collaboration cell;

selecting a second preset quantity of collaboration cells having highest priorities from a collaboration cell having a same transmission scenario as the collaboration cell having the highest priority;

forming a third cell connection set by using the serving cell, the collaboration cell having the highest priority and the selected second preset quantity of collaboration cells, and forming a third transmission scenario set by using the transmission scenario of the collaboration cell having the highest priority;

calling a corresponding collaboration function according to the third transmission scenario set; and performing collaborative work on the cells in the third cell connection set by using the collaboration function.

Further, the calling a corresponding collaboration function according to the third transmission scenario set includes:

acquiring the corresponding collaboration function from a correspondence between a transmission scenario set and the collaboration function according to the third transmission scenario set.

In this embodiment of the present invention, according to a transmission delay and a transmission bandwidth that are of a serving cell and a transmission delay and a transmission bandwidth that are of at least one collaboration cell, a transmission scenario of each collaboration cell is separately acquired, a different collaboration function is adaptively called according to the transmission scenario of each collaboration cell, and a cell that meets a delay requirement and a bandwidth requirement is adaptively selected, according to a system transmission condition, to participate in the collaboration function, which ensures normal work of the collaboration function and enables the collaboration function to produce a maximum collaboration function gain.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. An apparatus for implementing collaborative work of cells, wherein the apparatus comprises:
   a first acquiring module, configured to acquire a transmission delay and a transmission bandwidth that are of a serving cell and a transmission delay and a transmission bandwidth that are of at least one collaboration cell;
   a second acquiring module, configured to separately acquire a transmission scenario of each collaboration cell of the at least one collaboration cell according to the transmission delay and the transmission bandwidth that are of the serving cell and a transmission delay and a transmission bandwidth that are of each collaboration cell; and
   a collaboration module, configured to call a collaboration function according to the transmission scenario of each collaboration cell, and implement collaborative work of cells by using the collaboration function.

2. The apparatus according to claim 1, wherein the second acquiring module comprises:
   a first acquiring unit, configured to acquire a transmission type of the serving cell according to the transmission delay and the transmission bandwidth that are of the serving cell;

a second acquiring unit, configured to separately acquire a transmission type of each collaboration cell according to the transmission delay and the transmission bandwidth that are of each collaboration cell; and a third acquiring unit, configured to separately acquire the transmission scenario of each collaboration cell according to the transmission type of the serving cell and the transmission type of each collaboration cell.

3. The apparatus according to claim 2, wherein the first acquiring unit comprises:

a first determining subunit, configured to determine a transmission delay range and a transmission bandwidth range that are of the serving cell according to the transmission delay and the transmission bandwidth that are of the serving cell; and a first acquiring subunit, configured to acquire the transmission type of the serving cell from a correspondence among the transmission delay range, the transmission bandwidth range, and the transmission type according to the transmission delay range and the transmission bandwidth range that are of the serving cell.

4. The apparatus according to claim 2, wherein the second acquiring unit comprises:

a second determining subunit, configured to separately determine a transmission delay range and a transmission bandwidth range that are of each collaboration cell according to the transmission delay and the transmission bandwidth that are of each collaboration cell; and a second acquiring subunit, configured to separately acquire the transmission type of each collaboration cell from a correspondence among the transmission delay range, the transmission bandwidth range, and the transmission type according to the transmission delay range and the transmission bandwidth range that are of each collaboration cell.

5. The apparatus according to claim 2, wherein:

the third acquiring unit is configured to separately acquire the transmission scenario of each collaboration cell from a correspondence among the transmission type of the serving cell, the transmission type of the collaboration cell, and the transmission scenario according to the transmission type of the serving cell and the transmission type of each collaboration cell.

6. The apparatus according to claim 1, wherein the collaboration module comprises:

a first selection unit, configured to select a collaboration cell having a same transmission scenario from each collaboration cell;

a first formation unit, configured to form a first cell connection set by using the serving cell and the selected collaboration cell, and form a first transmission scenario set by using the transmission scenario of the selected collaboration cell;

a first call unit, configured to call a corresponding collaboration function according to the first transmission scenario set; and a first collaboration unit, configured to perform collaborative work on the cells in the first cell connection set by using the collaboration function.

7. The apparatus according to claim 6, wherein:

the first call unit is configured to acquire the corresponding collaboration function from a correspondence between a transmission scenario set and the collaboration function according to the first transmission scenario set.

8. The apparatus according to claim 1, wherein the collaboration module comprises:

a second selection unit, configured to select a preset quantity of collaboration cells having highest priorities from each collaboration cell;

a second formation unit, configured to form a second cell connection set by using the serving cell and the selected preset quantity of collaboration cells, and form a second transmission scenario set by using the transmission scenario of the selected preset quantity of collaboration cells;

a second call unit, configured to call a corresponding collaboration function according to the second transmission scenario set; and a second collaboration unit, configured to perform collaborative work on the cells in the second cell connection set by using the collaboration function.

9. The apparatus according to claim 8, wherein:

the second call unit is configured to acquire the corresponding collaboration function from a correspondence between a transmission scenario set and the collaboration function according to the second transmission scenario set.

10. The apparatus according to claim 1, wherein the collaboration module comprises:

a third selection unit, configured to select a collaboration cell having a highest priority from each collaboration cell;

a fourth selection unit, configured to select a second preset quantity of collaboration cells having highest priorities from a collaboration cell having the same transmission scenario as the collaboration cell having the highest priority;

a third formation unit, configured to form a third cell connection set by using the serving cell, the collaboration cell having the highest priority and the selected second preset quantity of collaboration cells, and form a third transmission scenario set by using the transmission scenario of the collaboration cell having the highest priority;

a third call unit, configured to call a corresponding collaboration function according to the third transmission scenario set; and a third collaboration unit, configured to perform collaborative work on the cells in the third cell connection set by using the collaboration function.

11. A method for implementing collaborative work of cells, wherein the method comprises:

acquiring a transmission delay and a transmission bandwidth that are of a serving cell and a transmission delay and a transmission bandwidth that are of at least one collaboration cell;

separately acquiring a transmission scenario of each collaboration cell of the at least one collaboration according to the transmission delay and the transmission bandwidth that are of the serving cell and a transmission delay and a transmission bandwidth that are of each collaboration cell; and calling a collaboration function according to the transmission scenario of each collaboration cell, and implementing collaborative work of cells by using the collaboration function.

12. The method according to claim 11, wherein the separately acquiring a transmission scenario of each collaboration cell of the at least one collaboration cell according to the transmission delay and the transmission bandwidth that are of the serving cell and a transmission delay and a transmission bandwidth that are of each collaboration cell comprises:

acquiring a transmission type of the serving cell according to the transmission delay and the transmission bandwidth that are of the serving cell;

separately acquiring a transmission type of each collaboration cell according to the transmission delay and the transmission bandwidth that are of each collaboration cell; and separately acquiring the transmission scenario of each collaboration cell according to the transmission type of the serving cell and the transmission type of each collaboration cell.

13. The method according to claim 12, wherein the acquiring a transmission type of the serving cell according to the transmission delay and the transmission bandwidth that are of the serving cell comprises:

determining a transmission delay range and a transmission bandwidth range that are of the serving cell according to the transmission delay and the transmission bandwidth that are of the serving cell; and acquiring the transmission type of the serving cell from a correspondence among the transmission delay range, the transmission bandwidth range, and the transmission type according to the transmission delay range and the transmission bandwidth range that are of the serving cell.

14. The method according to claim 12, wherein the separately acquiring a transmission type of each collaboration cell according to the transmission delay and the transmission bandwidth that are of each collaboration cell comprises:

separately determining a transmission delay range and a transmission bandwidth range that are of each collaboration cell according to the transmission delay and the transmission bandwidth that are of each collaboration cell; and separately acquiring the transmission type of each collaboration cell from a correspondence among the transmission delay range, the transmission bandwidth range, and the transmission type according to the transmission delay range and the transmission bandwidth range that are of each collaboration cell.

15. The method according to claim 12, wherein the separately acquiring the transmission scenario of each collaboration cell according to the transmission type of the serving cell and the transmission type of each collaboration cell comprises:

separately acquiring the transmission scenario of each collaboration cell from a correspondence among the transmission type of the serving cell, the transmission type of the collaboration cell, and the transmission scenario according to the transmission type of the serving cell and the transmission type of each collaboration cell.

16. The method according to claim 11, wherein the calling a collaboration function according to the transmission scenario of each collaboration cell, and implementing collaborative work of cells by using the collaboration function comprises:

selecting a collaboration cell having a same transmission scenario from each collaboration cell;

forming a first cell connection set by using the serving cell and the selected collaboration cell, and forming a first transmission scenario set by using the transmission scenario of the selected collaboration cell;

calling a corresponding collaboration function according to the first transmission scenario set; and performing collaborative work on the cells in the first cell connection set by using the collaboration function.

17. The method according to claim 16, wherein the calling a corresponding collaboration function according to the first transmission scenario set comprises:

acquiring the corresponding collaboration function from a correspondence between a transmission scenario set and the collaboration function according to the first transmission scenario set.

18. The method according to claim 11, wherein the calling a collaboration function according to the transmission scenario of each collaboration cell, and implementing collaborative work of cells by using the collaboration function comprises:

selecting a first preset quantity of collaboration cells having highest priorities from each collaboration cell;

forming a second cell connection set by using the serving cell and the selected first preset quantity of collaboration cells, and forming a second transmission scenario set by using the transmission scenario of the selected first preset quantity of collaboration cells;

calling a corresponding collaboration function according to the second transmission scenario set; and performing collaborative work on the cells in the second cell connection set by using the collaboration function.

19. The method according to claim 18, wherein the calling a corresponding collaboration function according to the second transmission scenario set comprises:

acquiring the corresponding collaboration function from a correspondence between a transmission scenario set and the collaboration function according to the second transmission scenario set.

20. The method according to claim 11, wherein the calling a collaboration function according to the transmission scenario of each collaboration cell, and implementing collaborative work of cells by using the collaboration function comprises:

selecting a collaboration cell having a highest priority from each collaboration cell;

selecting a second preset quantity of collaboration cells having highest priorities from a collaboration cell having the same transmission scenario as the collaboration cell having the highest priority;

forming a third cell connection set by using the serving cell, the collaboration cell having the highest priority and the selected second preset quantity of collaboration cells, and forming a third transmission scenario set by using the transmission scenario of the collaboration cell having the highest priority;

calling a corresponding collaboration function according to the third transmission scenario set; and performing collaborative work on the cells in the third cell connection set by using the collaboration function.

* * * * *

UNITED STATES PATENT AND TRADEMARK OFFICE
CERTIFICATE OF CORRECTION

| | |
|---|---|
| PATENT NO. | : 9,769,729 B2 |
| APPLICATION NO. | : 15/343593 |
| DATED | : September 19, 2017 |
| INVENTOR(S) | : Jueping Wang et al. |

It is certified that error appears in the above-identified patent and that said Letters Patent is hereby corrected as shown below:

On the Title Page

On page 2 Item [56] (References Cited) Column 1, Line 51:
Delete "Wang" and insert -- Lim --, therefore.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*